Figure 1:
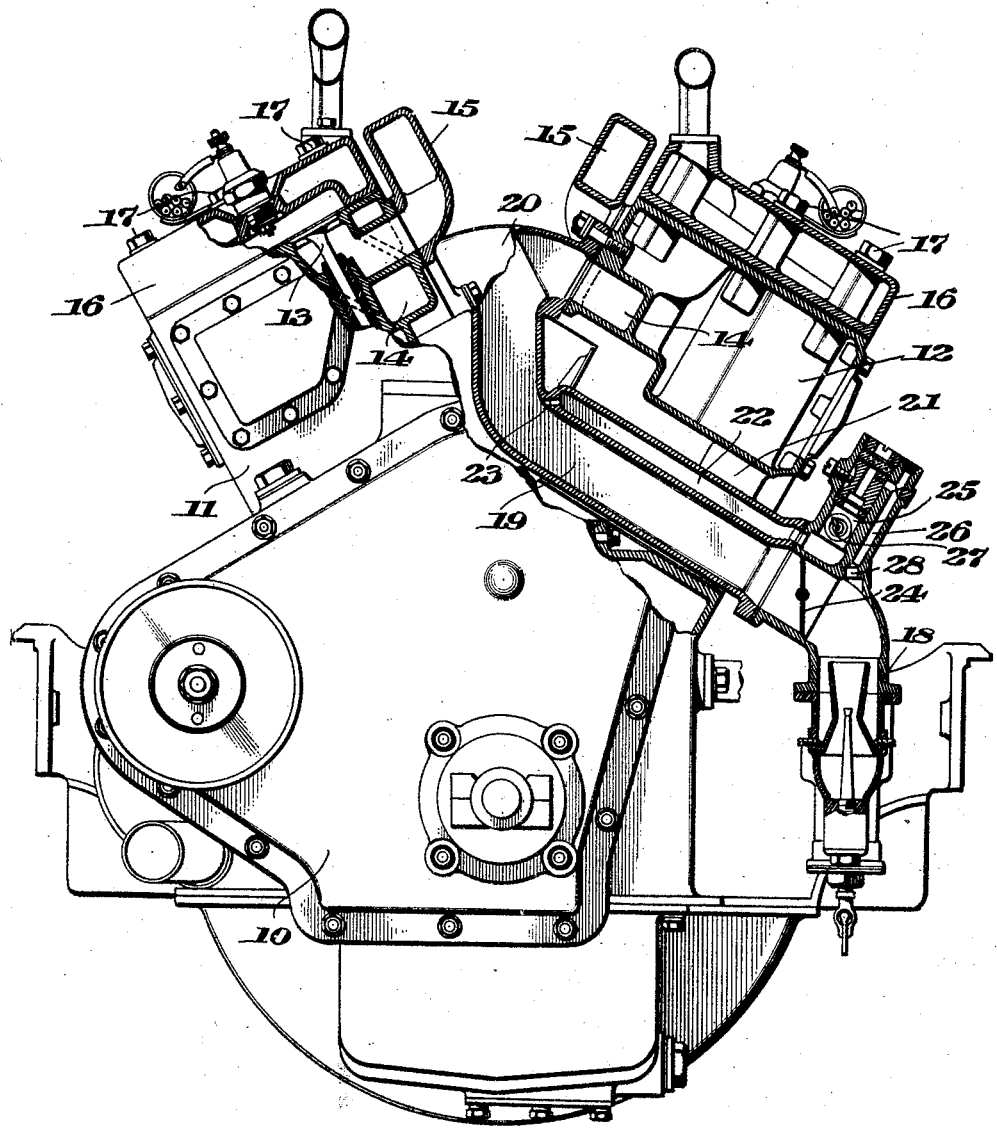

June 9, 1925.
J. G. VINCENT
HYDROCARBON MOTOR
Filed Sept. 4, 1920
1,540,967
2 Sheets-Sheet 2
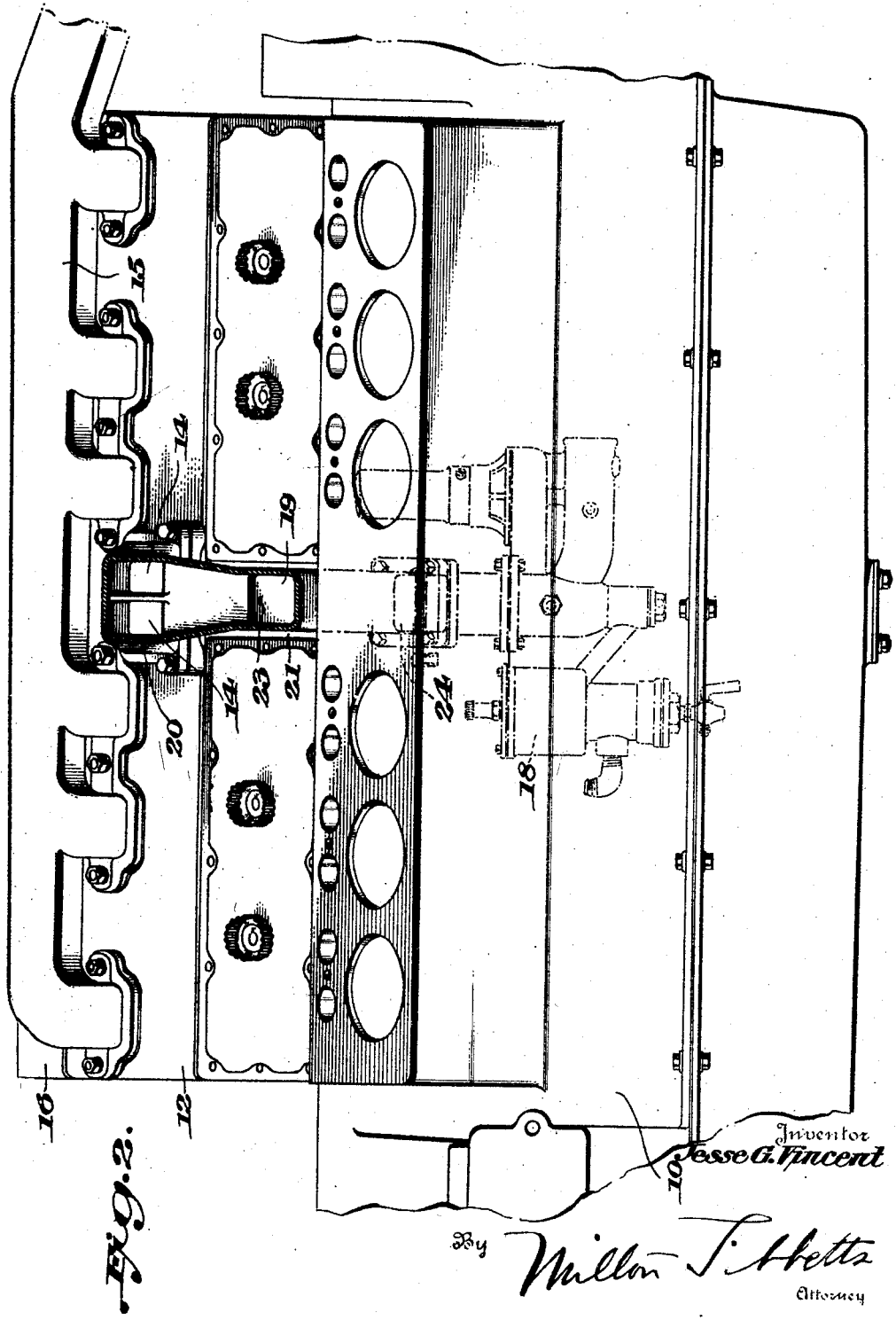

Patented June 9, 1925.

1,540,967

UNITED STATES PATENT OFFICE.

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN.

HYDROCARBON MOTOR.

Application filed September 4, 1920. Serial No. 408,236.

*To all whom it may concern:*

Be it known that I, JESSE G. VINCENT, a citizen of the United States, and resident of Detroit, Wayne County, State of Michigan, have invented certain new and useful Improvements in Hydrocarbon Motors, of which the following is a specification.

This invention relates to hydrocarbon motors, and particularly to the construction and arrangement of the cylinders, intake passages, and carburetor and heating means.

One of the objects of the invention is to provide an efficient heating means for the intake conduit, arranged to prevent the loss of heat therefrom.

Another object of the invention is to provide a V-type motor with an outside carburetor and efficient intake passages therefrom to the cylinders.

Other objects of the invention will appear from the following description taken in connection with the drawings which form a part of this specification, and in which—

Figure 1 is a front elevation and transverse section of a hydrocarbon motor embodying the invention; and Figure 2 is a side elevation of the motor shown in Figure 1, with one of the cylinder blocks removed, and with parts shown in section.

Referring to the drawings, 10 represents the crank case of a hydrocarbon motor, upon which are mounted, in the form shown, two cylinder blocks 11 and 12. Each of these blocks comprises six cylinders with suitable water jackets and with suitable valves and intake and exhaust passages. One of the exhaust valves is shown at 13, in Figure 1, and a longitudinally extending intake passage is shown at 14 and an exhaust pipe for each cylinder block at 15. Each of the blocks is provided with a cylinder head 16 properly secured to it as by bolts 17.

The intake and exhaust manifolds or passages, above referred to, are arranged on the inside of the cylinder blocks, and the intake passages are supplied from a carburetor 18 arranged on one of the outer sides of the motor. Thus the carburetor is accessible and it is also far enough away from the excessive heat of the exhaust pipes to insure that there will be no boiling of its fuel.

In order that the mixture from the carburetor to the intake manifolds 14 may pass continuously upwardly, to thereby get the best result and prevent the formation of pockets of condensed fuel, a conduit or pipe 19 is provided and it extends diagonally upwardly from the top of the carburetor 18 through one of the cylinder blocks to the intake manifolds. The upper end of the conduit 19 is in the form of a T, as shown at 20, and the two branches of the T are connected to the respective intake manifolds 14.

One of the cylinder blocks, the block 12 in the form shown, is formed with a transverse passage 21 between two of its cylinders, preferably cylinders 3 and 4, to make room for the conduit 19, and since this passage 21 is below the water jacket of the cylinder block, it takes up very little room longitudinally of the block.

It is desirable that the mixture passing to the motor shall be heated to facilitate vaporization and prevent condensation. The pipe or conduit 19, therefore, is provided with a heating jacket 22, most of which is on that portion of the pipe arranged in the passage 21 so that there is very little dissipation of heat from the jacket. In fact the passage 21 is kept hot from the heat of the cylinder walls, and, therefore, practically all of the heat of the heating jacket 22 passes inwardly to the intake pipe 19 through which the mixture passes.

The mixture heater shown is of the combustion type, and it comprises, in addition to the jacket 22, which has an outlet 23 into the intake pipe 19 above a throttle valve 24, a combustion chamber 25 in communication with the jacket 22, a passage 26 leading from the carburetor 18 to the combustion chamber 25, and a spark plug 27 for firing the charge of mixture which enters the chamber 25 through the passage 26. It will be noted that the inlet end 28 of the passage 26 is arranged at the elbow forming the connection between the upper end of the carburetor 18 and the conduit 19, and it is found that this arrangement provides a good mixture for the combustion heater.

In operation, when the throttle valve 24 is nearly closed for idling, the high suction in the intake pipe 19 is communicated to the jacket 22 and chamber 25 through the opening 23, and thus a suitable mixture is drawn from the carburetor 18 through the passage 26 into the combustion chamber 25.

The mixture is burned in the combustion chamber 25 and jacket 22 and the hot burnt gas passes through 23 into the intake pipe 19 where it mixes with the incoming mixture for the motor cylinders. The incoming mixture, therefore, is heated both by the heat from the jacket 22 and by direct contact with the hot gas which passes into the conduit 19 from the combustion heater.

A specific embodiment of the invention has been described in detail and will be specifically claimed, but it will be understood that the invention is not limited to the exact details of construction shown, as it will be apparent that changes may be made without departing from the spirit or scope of the invention.

Having thus described my invention, what I claim and desire to secure by Letters Patent is:

1. In a V-type hydrocarbon motor, the combination with two cylinder blocks having intake passages, of an intake conduit extending through one of said blocks on an incline and connected at its upper end to said intake passages, a carburetor connected to the lower end of said conduit, and a heater jacket on the inclined part of said conduit.

2. In a hydrocarbon motor, the combination with a cylinder block having a transverse passage between two of the cylinders, of an intake pipe extending through said passage and having a heating jacket in the passage.

3. In a V-type hydrocarbon motor, the combination with a cylinder block thereof, of an intake conduit extending through the block on an incline, a carburetor connected to the conduit, and a combustion heater device connected to the conduit at the angle between the carburetor and the conduit.

In testimony whereof I affix my signature.

JESSE G. VINCENT.